US008844663B2

(12) United States Patent
Jo et al.

(10) Patent No.: US 8,844,663 B2
(45) Date of Patent: Sep. 30, 2014

(54) TWIN ENGINE FOR IMPROVING FUEL EFFICIENCY AND METHOD OF OPERATING ENGINE USING THE SAME

(75) Inventors: Wonjin Jo, Hwaseong-si (KR); Hyunwook Shin, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 306 days.

(21) Appl. No.: 13/310,309

(22) Filed: Dec. 2, 2011

(65) Prior Publication Data
US 2013/0081889 A1     Apr. 4, 2013

(30) Foreign Application Priority Data

Oct. 4, 2011    (KR) .................. 10-2011-0100587

(51) Int. Cl.
| | | |
|---|---|---|
| B60W 30/18 | (2012.01) | |
| F02B 73/00 | (2006.01) | |
| F02D 41/06 | (2006.01) | |
| F02D 25/00 | (2006.01) | |
| B60K 5/08 | (2006.01) | |
| B60W 10/06 | (2006.01) | |
| B60W 10/02 | (2006.01) | |

(52) U.S. Cl.
CPC ............... *F02D 25/00* (2013.01); *F02B 73/00* (2013.01); *F02D 41/062* (2013.01); *B60K 5/08* (2013.01); *B60W 10/06* (2013.01); *B60W 10/02* (2013.01)
USPC ............................................ 180/69.6; 477/2

(58) Field of Classification Search
USPC ................. 180/69.2, 69.6; 477/2; 701/99
See application file for complete search history.

(56) References Cited

U.S. PATENT DOCUMENTS

| | | | | | |
|---|---|---|---|---|---|
| 4,312,372 | A | * | 1/1982 | Amos et al. .................... | 137/266 |
| 4,392,393 | A | * | 7/1983 | Montgomery ................... | 74/661 |
| 4,421,217 | A | * | 12/1983 | Vagias .............. | 477/6 |
| 4,566,279 | A | * | 1/1986 | Kronogard et al. ............. | 60/718 |
| 6,306,056 | B1 | * | 10/2001 | Moore ............... | 475/5 |
| 6,516,265 | B1 | * | 2/2003 | Sommer et al. ............... | 701/115 |
| 6,722,458 | B2 | * | 4/2004 | Hofbauer ............ | 180/65.25 |
| 6,852,062 | B1 | * | 2/2005 | Ahner et al. ........ | 477/2 |
| 6,935,115 | B2 | * | 8/2005 | Anderson ........... | 60/698 |
| 7,152,705 | B2 | * | 12/2006 | Alster et al. ........... | 180/65.245 |
| 7,270,030 | B1 | * | 9/2007 | Belloso ........ | 74/661 |
| 7,325,638 | B1 | * | 2/2008 | Belloso ............ | 180/69.6 |
| 7,416,510 | B2 | * | 8/2008 | Gebby .............. | 477/2 |

FOREIGN PATENT DOCUMENTS

| | | |
|---|---|---|
| JP | 58-126444 A | 7/1983 |
| JP | 5-24463 A | 2/1993 |
| JP | 5-26312 A | 2/1993 |
| JP | 5-202763 A | 8/1993 |

(Continued)

*Primary Examiner* — John Walters
*Assistant Examiner* — Brian Swenson
(74) *Attorney, Agent, or Firm* — Morgan, Lewis & Bockius LLP

(57) ABSTRACT

A twin engine improves fuel efficiency in a low-load section and generates sufficient output in a high-load section by selecting a specific bank or operating all of the banks in accordance with necessity of required load. The twin engine may include a plurality of engine banks that independently operates in a unit of a cylinder block equipped with a plurality of cylinders, transmissions that are provided at the same number of engine banks and disposed between output ends of engine banks, a power controller that selectively collects the power output from the output ends of transmissions and transmits the power to driving wheels, and a driving controller that controls the operations of the engine banks and the power controller, such that the engine banks are selectively or simultaneously operated in accordance with traveling conditions.

6 Claims, 3 Drawing Sheets

(56) References Cited

FOREIGN PATENT DOCUMENTS

| | | |
|---|---|---|
| JP | 5-203027 A | 8/1993 |
| JP | 6-21565 B2 | 3/1994 |
| JP | 6-255377 A | 9/1994 |
| JP | 2003-83105 A | 3/2003 |
| KR | 10-0992402 B1 | 11/2010 |
| KR | 10-2012-0140103 A | 12/2012 |
| WO | WO 82/01916 A1 | 6/1982 |

* cited by examiner

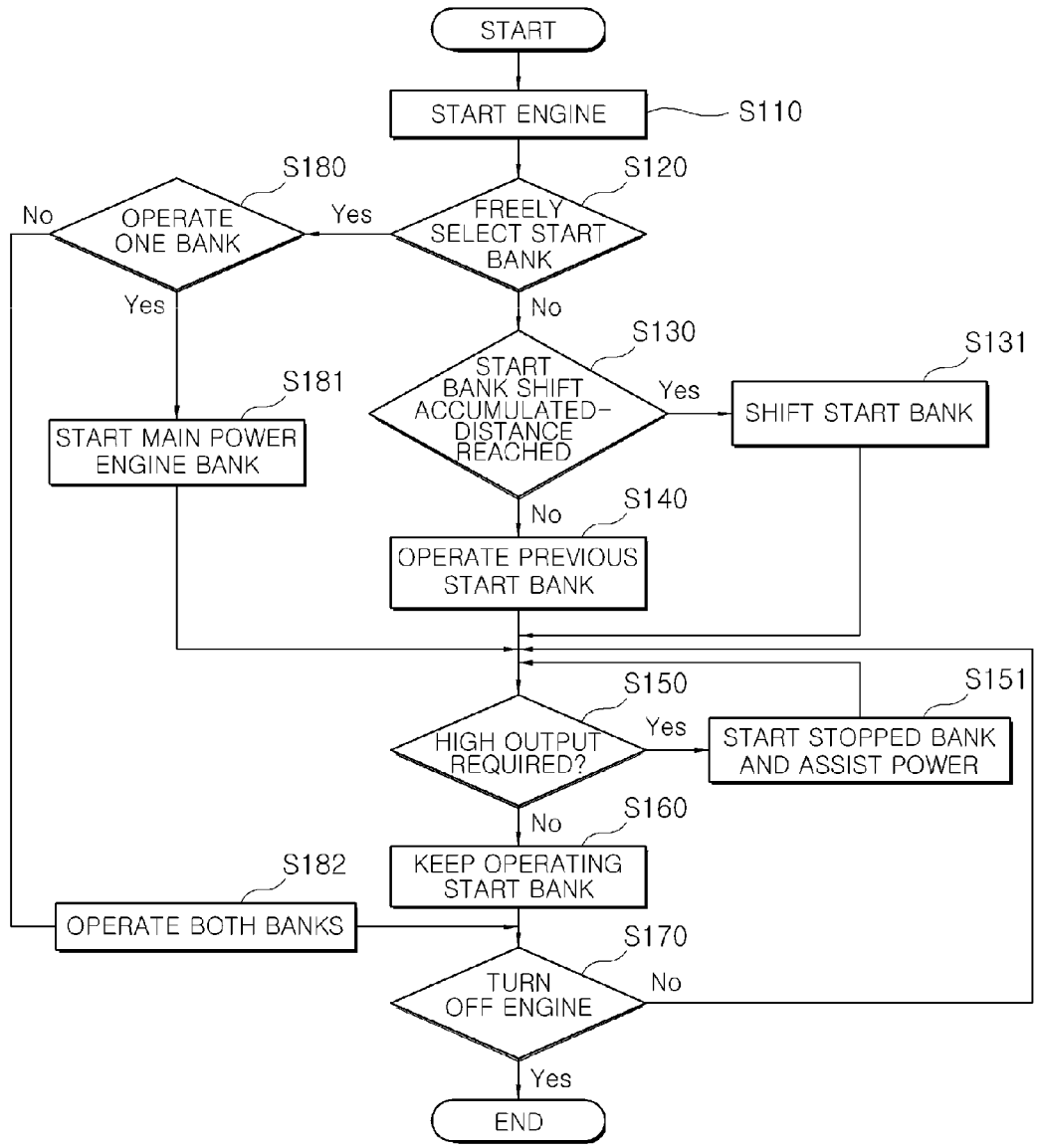

TWIN ENGINE FOR IMPROVING FUEL EFFICIENCY AND METHOD OF OPERATING ENGINE USING THE SAME

CROSS-REFERENCE TO RELATED APPLICATIONS

The present application claims priority to Korean Patent Application Number 10-2011-0100587 filed Oct. 4, 2011, the entire contents of which application is incorporated herein for all purposes by this reference.

BACKGROUND OF INVENTION

1. Field of Invention

The present invention relates to a twin engine composed of a plurality of engine banks, and more particularly, to a twin engine for improving fuel efficiency which improves fuel efficiency in a low-load section by selecting a specific engine bank or operating all of the engine banks in accordance with necessity of load, and makes sufficient output in a high-load section, and a method of operating an engine using the same.

2. Description of Related Art

Recently, with the increase in oil prices, technologies of improving fuel efficiency by stopping some of cylinders in section where high output is not required, such as starting of the engine, traveling at a low speed, and traveling on a downhill, even for vehicles requiring high output, has been researched, but they are hardly applied in practice.

The engines using gasoline or diesel as fuel are generally multi-cylinder engines having a plurality of cylinders in one cylinder block.

The maximum output of the multi-cylinder engines depends on the number of cylinders and the actual output is controlled by the acceleration pedal.

However, there is a problem in that the fuel efficiency is lows because all of the cylinders of the engines are operated even in the section where high output is not required, such as starting of the engines, traveling at a low speed, and traveling on a downhill.

An example of classifying some of the cylinders into one group and operating the cylinders of each group, in a multi-cylinder engine, has been proposed as a method for removing the problem, as in the following Patent Document.

However, since the pistons in the cylinders keep reciprocating even if fuel is not supplied, the reciprocation of the pistons acts as driving resistance, in the Korean Patent No. 10-0992402 B1.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a twin engine for improving fuel efficiency in which the engine is composed of a plurality of banks and some of the engine banks are operated in a low-load traveling section by selectively operating the engine banks and all of the engine banks are operated in a high-load traveling section, and a method of operating the engine using the same.

The present invention has been made in an effort to provide a twin engine for improving fuel efficiency which can improve fuel efficiency by satisfying the climate or regulation conditions of the traveling area, by supplying different kinds of fuel to different engine banks or making the displacement of a plurality of engine banks different, and a method of operating the engine using the same.

The present invention has been made in an effort to provide a twin engine for improving fuel efficiency that allows different engine banks to operate only for the front wheels or the rear wheels, and a method of operating the engine using the same.

Various aspects of the present invention provide for a twin engine for improving fuel efficiency, including a plurality of engine banks that independently operates in a unit of a cylinder block equipped with a plurality of cylinders, transmissions that are provided the same number of the engine banks and disposed at output ends of the engine banks, a power controller that selectively collects the power output from the output ends of the transmissions and transmits the power to driving wheels, and a driving controller that controls the operations of the engine banks and the power controller.

The power controller may include driving gears disposed at the output ends of the transmissions, a main shaft gear that is connected to the output shaft operating the driving wheels, an interrupter gear that is selectively engaged between the driving gear and the main shaft gear, and an actuator that engages the interrupter gear with the driving gear and the main shaft gear.

The driving controller may operate the engine banks and operates the actuator to engage or separate the interrupter gear between the driving gear and the main shaft gear.

Other aspects of the present invention provide for a twin engine for improving fuel efficiency, including a plurality of engine banks that independently operates in a unit of a cylinder block equipped with a plurality of cylinders, transmissions that provided at are the same number of the engine banks and disposed at output ends of the engine banks, and a driving controller that controls the operation of the engine banks, in which the engine banks may operate only for the front wheels or the rear wheels of a vehicle.

Any one of the engine banks may be connected to the rear wheels connected with the transmission at the output ends and the other engine bank may be connected with the front wheels connected with the transmission at the output ends.

The engine banks may have different displacement.

The engine banks may be operated by different kinds of fuel.

Other aspects of the present invention provide for a method of operating an engine using a twin engine, including a starting step that operates a start key to start the engine, a start bank selecting step that freely selects an engine bank to operate any one of a plurality of engine banks, a start bank shift accumulated-distance reaching determining step that determines whether to reach a predetermined accumulated-distance to shift the start bank while the ECU uses the engine bank, which has been used before, as a start bank unless a start bank is not freely selected in the start bank selecting step, a previous start bank operating step that operates the engine bank that has been started before when it is determined in the start bank shift accumulated-distance reaching determining step that it does not reach the start bank shift accumulated-distance, a high output request determining step that determines whether high output is required by determining the traveling condition of the vehicle while driving the vehicle by using the engine bank operated in the previous start bank operating step, a start bank operating continuing step that allows the vehicle to travel by using the bank that has been used for starting the engine when it is determined that high output is not required in the high output request determining step, and a stop determining step that determines whether the vehicle is stopped.

When the start bank shift accumulated-distance reaching determining step determines that it does not reach a predetermined start bank shift accumulated-distance, the start bank shift operating step that shifts the previous start bank to another engine bank to start the engine may be performed, and a high output request determining step may be performed after the start bank shift operating step.

When the high output request determining step determines that high output is required, a power assisting step that starts a stopped engine bank may be performed, and after the power assisting step, the process may return to the high output request determining step that periodically determines whether high output keeps required.

When a start bank is freely selected in the start bank selecting step, a driving mode selecting step that determines whether to operate only one or all of the engine banks may be performed.

When only one engine bank is selected to operate in the driving mode selecting step, a main power bank operating step that operate the engine bank that has been operated for previous starting of the engine may be performed, and when all of the engine banks are selected to operate in the driving mode selecting step, a maximum operating step that operates all of the engine banks regardless of traveling conditions of the vehicle may be performed.

The high output request determining step may be performed after the main power bank operating step.

According to a twin engine for improving fuel efficiency having the configuration and a method of operating an engine using the twin engine, it is possible to prevent unnecessary consumption of fuel and improve fuel efficiency by operating some of engine banks in a low-load traveling section and operating all of the engine banks in a high-load traveling section, in accordance with the traveling conditions of a vehicle.

Since it is possible to use different kinds of fuel for different engine banks or make the displacement different, it is possible to maximize the output or actively correspond to environmental regulations of the area where the vehicle travels.

Since a plurality of engine banks is provided, it is possible to drive the vehicle by using the other engine bank when any one of the engine banks is broken.

It is possible to achieve high output by combining a plurality of engines with small output which can be manufactured at a low cost in large quantities.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a flowchart illustrating an exemplary method of operating an engine using a twin engine according to the present invention.

Figure 1:
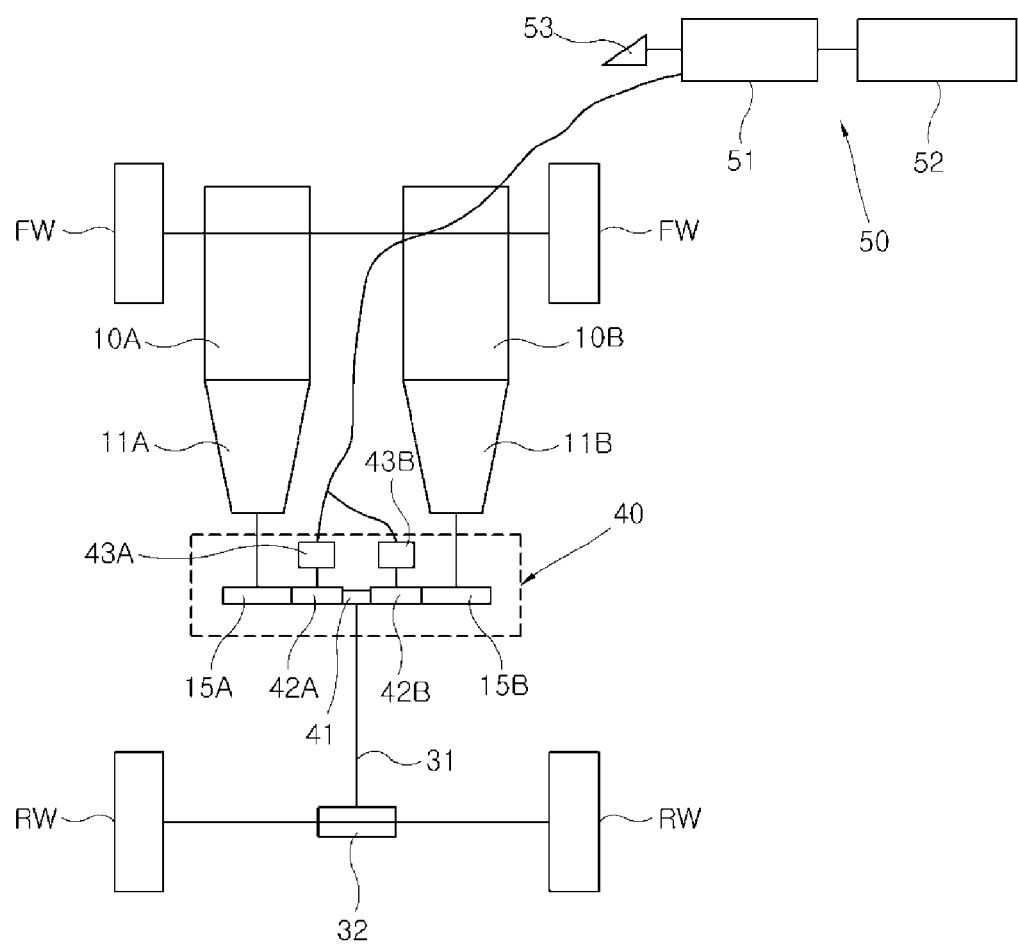
FIG. 1 is a conceptual view showing the configuration of an exemplary twin engine for improving fuel efficiency according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

A twin engine for improving fuel efficiency according to various embodiments of the present invention is described in detail with reference to the accompanying drawings.

A twin engine for improving fuel efficiency according to various embodiments of the present invention includes a plurality of engine banks 10A and 10B that can independently operate, in which engine banks 10A and 10B are selectively or simultaneously operated in accordance with traveling conditions and the entire power from engine banks 10A and 10B is collected outputted to the driving wheels.

A plurality of engine banks 10A and 10B is provided. Engine banks 10A and 10B are each equipped with a plurality of cylinders in one cylinder block and they can independently operate.

A plurality of engine banks 10A and 10B are selectively or simultaneously operated, if necessary. For example, as shown in FIG. 1, when engine banks 10A and 10B are a first engine bank 10A and a second engine bank 10B, it is possible to select and operate any one of first engine bank 10A and second engine bank 10B while stopping the other one, or operate all of two engine banks 10A and 10B, in accordance with the traveling conditions of the vehicle.

Transmission 11A and 11B that transmit the power outputted from engine banks 10A and 10B are disposed at the output ends of engine banks 10A and 10B, respectively. For example, a first transmission 11A is connected to the output end of first engine bank 10A and a second transmission 11B is connected to the output end of second engine bank 10B.

A power controller 40 is provided to transmit the power generated from first engine bank 10A or second engine bank 10B to the driving wheels, such that it transmits the entire power outputted from the engine banks that are in operation in first engine bank 10A and second engine bank 10B to the driving wheels.

That is, as shown in FIG. 1, power controller 40 includes a main shaft gear 41 disposed between a first driving gear 15A and a second driving gear 15B, which are connected to first transmission 11A and second transmission 11B, respectively, a first interrupter gear 42A and a second interrupter gear 42B that are disposed between first driving gear 15A, second driving gear 15B, and main shaft gear 41, respectively, to connect/disconnect power, and actuators 43A and 43B that engage interrupter gears 42A and 42B with main shaft gear 41.

When driving gears 15A and 15B are connected with main shaft gear 41, the power generated from engine banks 10A and 10B is transmitted to the rear wheels RW and interrupter gears 42A and 42B are selectively engaged with driving gears 15A and 15B and main shaft gear 41 by the operation of actuators 43A and 43B, such that the power generated from engine banks 10A and 10B can be transmitted to the driving wheels, that is, rear wheels RW.

Main shaft gear 41 is connected to an output shaft 31 that transmits power to rear wheels RW. Output shaft 31 is connected to a differential gear 32 that distributes and transmits power to rear wheels RW, such that it can operate rear wheels RW, as main shaft gear 41 rotates.

Interrupter gears 42A and 42B are connected to the engine bank of which main shaft gear 41 is in operation and transmits the power generated from the engine bank to main shaft gear 41, but they are disconnected from the engine bank that is stopping to prevent driving resistance due to the stopped engine bank.

Actuators 43A and 43B allow interrupter gears 42A and 42B to be engaged with or separated from driving gears 15A and 15B and main shaft gear 41. As interrupter gears 42A and 42B are engaged with or separated from driving gears 15A and 15B and main shaft gear 41 by the operation of actuators 43A and 43B, actuators 43A and 43B engage interrupter gears 42A and 42B with driving gears 15A and 15B and main shaft gear 41 such that driving gears 15A and 15B and main shaft gear 41 at engine banks 10A and 10B that are in operation are connected, and separate driving gears 15A and 15B from main shaft gear 41 at stopped engine banks 10A and 10B.

As described above, the power inputted to power controller 40 is transmitted to the driving wheels through output shaft 31, and differential gear 32, if necessary, to drive the vehicle.

A driving controller 50 is provided to control first engine bank 10A or second engine bank 10B to operate or stop, or control the operation of power controller 40. Driving controller 50 includes an ECU 51 connected to an acceleration pedal 53 and a battery 52, as a main component, and ECU 51 controls whether to operate first engine bank 10A and second engine bank 10B and also controls connection/disconnection of power by controlling the operation of actuators 43A and 43B.

The twin engine for improving fuel efficiency selectively operates one of first engine bank 10A and second engine bank 10B or operate all of them, by selection of the driver or the degree of requested output from the acceleration pedal, and the entire power generated from first engine bank 10A and second engine bank 10B is collected by power controller 40 and then transmitted to the driving wheels.

According to the twin engine for improving fuel efficiency including engine banks 10A and 10B, according to various embodiments of the present invention, first engine bank 10A or second engine bank 10B is selectively operated or all of first engine bank 10A and second engine bank 10B are operated, in accordance with the traveling conditions of the vehicle.

For example, only any one of first engine bank 10A and second engine bank 10B is operated under a low-load traveling condition where large load is not required, such as starting of an engine, traveling at a low speed, or traveling on a downhill. That is, in the low-load traveling condition, ECU 51 or the driver determines an engine bank to operate and operates interrupter gears 42A and 42B with actuators 43A and 43B, such that the power of the driven engine banks 10A and 10B is transmitted to the driving wheels. When first engine bank 10A is operated, power is transmitted to the driving wheels from first engine bank 10A through output shaft 31 and differential gear 32 after passing through first transmission gear 11A, first driving gear 15A, first interrupter gear 42A, and main shaft gear 41, or when second engine bank 10B is operated, power is transmitted to the driving wheels from second engine bank 10B through output shaft 31 and differential gear 32 after sequentially passing through second transmission 11B, second driving gear 15B, second interrupter gear 42B, and main shaft gear 41.

Engine banks 10A and 10B can be implemented by combining the same engines, but may be implemented by combining different engines. That is, it is possible to use any one of the engine banks as the main power source and the other as a sub-power source, by making the displacement of first engine bank 10A and second engine bank 10B different to generate different output.

It may be possible to operate first engine bank 10A and second engine bank 10B by using different kinds of fuel.

For example, by operating first engine bank 10A and second engine bank 10B with combination of gasoline-gasoline, gasoline-diesel, or diesel-diesel, it is possible to achieve the advantages of a gasoline engine and a diesel engine and correspond to the climate conditions or the environmental regulations of the area where the vehicle travels.

The case of gasoline-gasoline may be applied to areas with intensive exhaust gas regulations or deluxe cars requiring silence. The case of gasoline-diesel may be applied to intensively cold areas because gasoline is good for starting an engine at a low temperature, such that the engine bank using gasoline as fuel is operated to start the engine and then the engine bank using diesel after warming-up is operated. Meanwhile, the case of diesel-diesel may be applied to vans or trucks in the areas without a cold season, such as tropical regions or sub-tropical regions.

First engine bank 10A and second engine bank 10B may be implemented by combining two cases of them. That, it is possible to not only make the displacement of first engine bank 10A and second engine bank 10B different, but make the fuel that is used different.

The twin engine according to various embodiments of the present invention may be implemented by combining a plurality of small engines, which can be manufactured at a low cost in large quantities, to achieve a high output engine and selectively operate one of or all of the engines in accordance with load.

Figure 2:
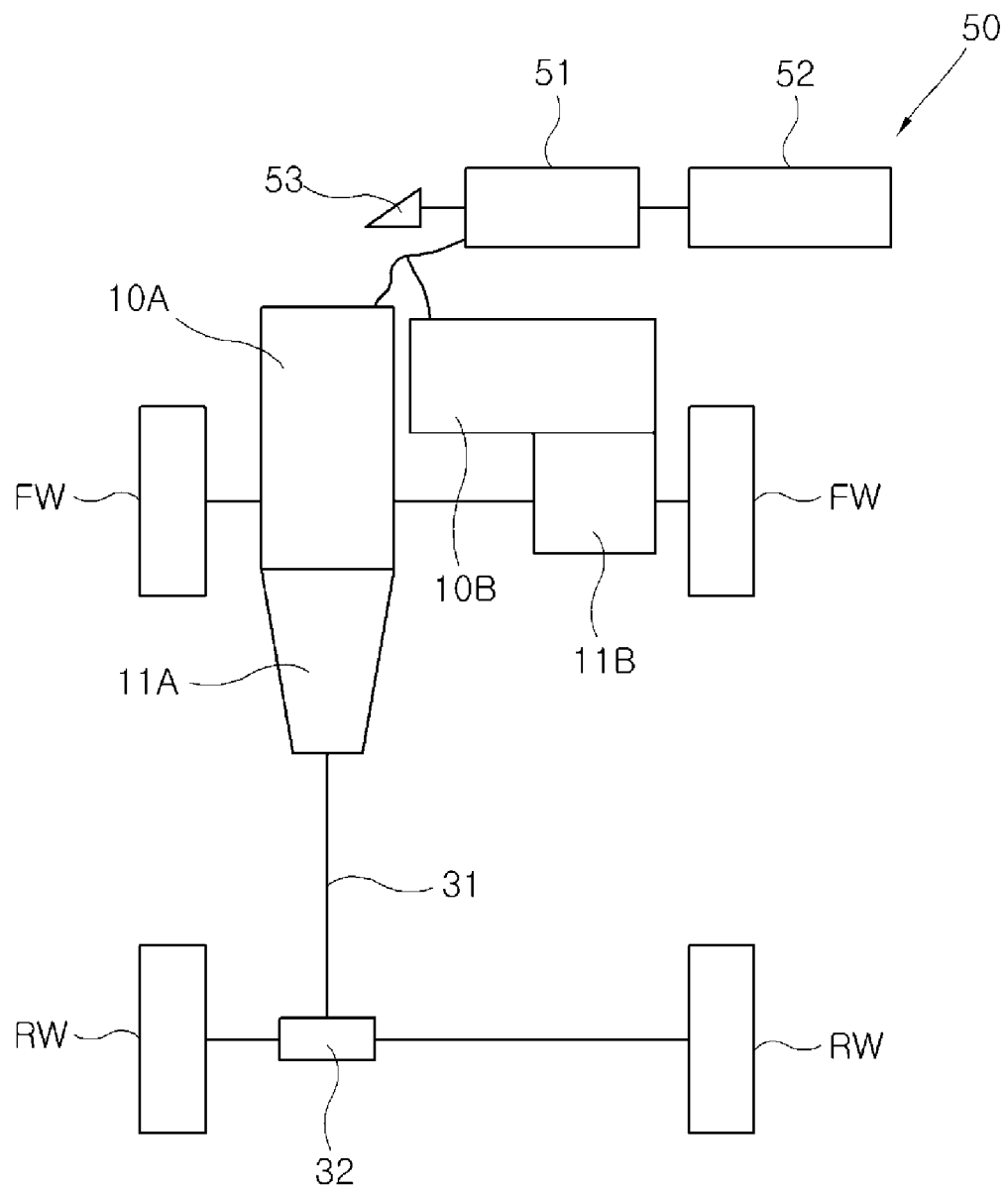
FIG. 2 is a conceptual view showing the configuration of an exemplary twin engine for improving fuel efficiency according to the present invention.

A twin engine for improving fuel efficiency according to other embodiments of the present invention is described hereafter in detail with reference to FIG. 2.

A twin engine for improving fuel efficiency according to various embodiments of the present invention includes a plurality of engine banks 10A and 10B such that engine banks 10A and 10B selectively operate only for the front wheels and the rear wheels, respectively.

That is, as shown in FIG. 2, when two engine banks 10A and 10B are provided, one engine bank 10A operates only for the rear wheels RW and the other engine bank 10B operates only for the front wheels FW.

First engine bank 10A is connected to the rear wheels RW through a first transmission 11A and an output shaft and second engine bank 10B is connected to the front wheels FW through a second transmission 11B, in which first engine bank 10A or second engine bank 10B is operated by an ECU 51.

As described above, when each of engine banks 10A and 10B operate only for any one of the front wheels FW and the rear wheels RW, as any one of first engine bank 10A and second engine bank 10B operate, the advantages of a front wheel-drive vehicle and a rear wheel-drive vehicle can be achieved, and when all of first engine bank 10A and second engine bank 10B operate, the maximum output of the vehicle can be achieved.

It is also possible in various embodiments to use different kinds of fuel or make the displacement different and implement first engine bank 10A and second engine bank 10B by applying all of the two conditions, when implementing first engine bank 10A and second engine bank 10B, as described in the above exemplary embodiments.

A method of operating an engine using a twin engine according to various embodiments of the present invention is described hereafter with reference to FIG. 3.

The method may include a starting step (S110) that operates a start key to start the engine, a start bank selecting step (S120) that freely selects an engine bank to operate any one of a plurality of engine banks, a start bank shift accumulated-distance reaching determining step (S130) that determines whether to reach a predetermined accumulated-distance to shift the start bank while the ECU uses the engine bank, which has been used before, as a start bank unless a start bank is not freely selected in the start bank selecting step, a previous start bank operating step (S140) that operates the engine bank that has been started before, a high output request determining step (S150) that determines whether high output is required by determining the traveling condition of the vehicle while driving the vehicle by using the bank operated in the previous start bank operating step (S140), and a start bank operating continuing step (S160) that allows the vehicle to travel by using the bank that has been used for starting the engine when it is determined that high output is not required in the high output request determining step.

The starting step (S110) includes all of operations for starting the engine, such as inserting and turning of the start key for driving or pushing of a start button.

The start bank selecting step (S120) allows the driver to select engine banks 10A and 10B to operate when starting the engine composed of engine banks 10A and 10B. For example, it is possible to select a bank to operate when starting the engine by operating a select button provided in the vehicle. When the driver freely select the start bank in the start bank selecting step (S120), a driving mode selecting step 180 described bellows is performed, or ECU 51 selects the start bank.

The start bank shift accumulated-distance reaching determining step (S130) is performed when the driver does not freely select the start bank but engine banks 10A and 10B to be operated are automatically selected in the start bank selecting step (S120), in which ECU 51 determines whether to use the bank that has been operated in the previous starting of the engine or whether to use the bank that did not operate in the previous starting of the engine. The start bank shift is determined on the basis of the accumulated traveling distance of the vehicle and the start bank is shifted for every predetermined traveling distance. For example, when a traveling distance of 10,000 km is set to as the accumulated-distance where the start bank is shifted in the engine composed of first engine bank 10A and second engine bank 10B, engine banks 10A and 10B to be used for starting the engine are shifted for every predetermined accumulated-distance such that first engine 10A is used at 0 km to 10,000 km for starting of the engine, second engine bank 10B is used at 10,000 km to 20,000 km for starting of the engine, first engine bank 10A is used again at 20,000 km to 30,000 km for starting of the engine, and second engine bank 10B is used at 30,000 km to 40,000 km for starting of the engine. Meanwhile, the accumulated-distance of the vehicle for shifting the start bank may be set to as another value.

The reason of shifting the start bank to user for starting of the engine for every predetermined accumulated-distance is for relatively uniformly using engine banks 10A and 10B because when a specific engine bank keeps used for starting of the engine or used for main power, it is worn out in comparison to the engine bank that relatively less operates.

When the start bank shift accumulated-distance reaching determining step (S130) determines that it does not reach the start bank shift accumulated-distance, in the previous start bank operating step (S140), the engine is started by the engine bank that has been used in previous starting of the engine. For example, when it does not reach the start bank shift accumulated-distance and the engine has been started by first engine bank 10A, the engine is started again by first engine bank 10A such that the vehicle travels. In general, since high output is not required for starting of the engine and the early stage of the starting of the engine, the vehicle can travel by one bank.

When the vehicle travels, the high output request determining step (S150) that periodically determines whether it is a situation requiring high output is performed. The high output request determining step (S150) ascertains the traveling state of the vehicle, and operates the stopped engine bank when it is a situation requiring high output or keeps only the engine bank, which is in operation, operating when it is not the state requiring high output.

When it is not the situation requiring high output, in the high output request determining step (S150), all of the engine banks are not operated, the engine bank that has been used for starting of the engine keeps operating and the other engine bank keeps stopped (S160).

Meanwhile, when in the high output request determining step (S150), it is determined that high output is required by sudden acceleration in traveling, traveling on an uphill, or high-speed traveling, fuel is supplied while the stopped engine bank is cranked, such that the stopped bank is also started and operated to output power, which assists the power output to the engine bank that is in operation (S151).

As described above, the process returns to the high output request determining step (S150) that determines whether it is the situation that keeps requiring high output even while all of engine banks 10A and 10B operate, that is, the vehicle travels with high output, and it is determined whether to drive with high output.

When start bank shift accumulated-distance reaching determining step (S130) determines that it reaches the start distance shift accumulated-distance, the engine bank that has been previously used is not used, but it is shifted to an engine bank to be used for starting of the engine such that the other engine bank that was not used for the previous starting of the engine is used in order to start the engine.

As described above, when the engine bank is shifted to start the engine, it is determined whether to operate the stopped engine bank by periodically determining whether high output is required (S150).

Meanwhile, the driver can freely select and operate the engine bank that has been used for starting of the engine. When the driver freely selects an engine bank to use for starting of the engine by using the select button in the start bank selecting step (S120), the driving mode selecting step 180 that determines whether to operate only one of the banks or all of engine banks 10A and 10B is performed.

When only one of the engine banks is selected to operate in the driving mode selecting step (S180), a main power engine bank operating step (S181) that starts the engine bank used for the previous starting of the engine is performed.

As described above, it is periodically determined whether high output is required even while the engine is started by one engine bank (S150), and when high output is required, the stopped engine bank (S151) is operated to generate the maximum output.

When all of the banks are selected to operate in the driving mode selecting step (S180), a maximum operating step (S182) that operates all of the banks of the engine regardless of the traveling conditions of the vehicle is performed.

A stop determining step (S170) is performed after the maximum operating step (S182).

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of operating an engine using a twin engine, the method comprising:
    a start-bank selecting step that freely selects an engine bank to operate any one of a plurality of engine banks;
    a start-bank shift accumulated-distance reaching determining step that determines whether to reach a predetermined accumulated-distance to shift the start bank while the ECU uses the engine bank, which has been used before, as a start bank unless a start bank is not freely selected in the start-bank selecting step;
    a previous start-bank operating step that operates the engine bank that has been started before when it is determined in the start-bank shift accumulated-distance reaching determining step that it does not reach the start-bank shift accumulated-distance;
    a high output request determining step that determines whether high output is required by determining the traveling condition of the vehicle while driving the vehicle by using the engine bank operated in the previous start-bank operating step;
    a start-bank operating continuing step that allows the vehicle to travel by using the bank that has been used for starting the engine when it is determined that high output is not required in the high output request determining step; and
    a stop determining step that determines whether the vehicle is stopped.

2. The method as defined in claim 1, wherein when the start-bank shift accumulated-distance reaching determining step determines that it reaches a predetermined start-bank shift accumulated-distance, the start-bank operating step that shifts the previous start bank to another engine bank to start the engine is performed, and the high output request determining step is performed after the start-bank shift operating step.

3. The method as defined in claim 1, wherein when the high output request determining step determines that high output is required, a power assisting step that starts a stopped engine bank is performed, and after the power assisting step, the process returns to the high output request determining step that periodically determines whether high output keeps required.

4. The method as defined in claim 1, wherein when a start bank is freely selected in the start-bank selecting step, a driving mode selecting step that determines whether to operate some or all of the engine banks is performed.

5. The method as defined in claim 4, wherein when some of engine banks are selected to operate in the driving mode selecting step, a main power bank operating step that operate the engine bank that has been operated for previous starting of the engine is performed, and
    when all of the engine banks are selected to operate in the driving mode selecting step, a maximum operating step that operates all of the engine banks regardless of traveling conditions of the vehicle is performed.

6. The method as defined in claim 5, wherein the high output request determining step is performed after the main power bank operating step.

* * * * *